(12) United States Patent
Chapagain et al.

(10) Patent No.: US 10,288,174 B2
(45) Date of Patent: May 14, 2019

(54) SEAL MEMBER FOR JOINT OF MACHINE

(71) Applicant: Caterpillar Inc., Peoria, IL (US)

(72) Inventors: Pradeep Chapagain, Peoria Heights, IL (US); Sunil I. Mathew, Peoria, IL (US); Charles Taylor Hudson, Decatur, IL (US)

(73) Assignee: Caterpillar Inc., Deerfield, IL (US)

(*) Notice: Subject to any disclaimer, the term of this patent is extended or adjusted under 35 U.S.C. 154(b) by 714 days.

(21) Appl. No.: 14/837,543

(22) Filed: Aug. 27, 2015

(65) Prior Publication Data

US 2016/0097455 A1 Apr. 7, 2016

Related U.S. Application Data

(60) Provisional application No. 62/060,390, filed on Oct. 6, 2014.

(51) Int. Cl.
| | |
|---|---|
| *F16J 15/3284* | (2016.01) |
| *F16J 3/04* | (2006.01) |
| *F16C 11/06* | (2006.01) |

(52) U.S. Cl.
CPC ....... *F16J 15/3284* (2013.01); *F16C 11/0614* (2013.01); *F16C 11/0676* (2013.01);
(Continued)

(58) Field of Classification Search
CPC .......... F16J 3/042; F16J 15/3284; F16J 15/52; F16C 11/0671; F16C 11/0676;
(Continued)

(56) References Cited

U.S. PATENT DOCUMENTS

| | | | | |
|---|---|---|---|---|
| 3,248,955 A | * | 5/1966 | Templeton | ............. B60G 7/005 277/635 |
| 3,343,855 A | * | 9/1967 | Husen | .................... B60G 7/005 277/391 |

(Continued)

FOREIGN PATENT DOCUMENTS

| | | |
|---|---|---|
| GB | 771254 | 3/1957 |
| JP | 29-63839 B2 | 10/1999 |

(Continued)

*Primary Examiner* — Matthew R McMahon
(74) *Attorney, Agent, or Firm* — Leydig, Voit & Mayer, Ltd.

(57) ABSTRACT

A seal member for a joint between a pivot member movable about a rotational axis of a shaft includes a ring, a flange, and a resiliently flexible intermediate portion interposed therebetween. The ring includes annular distal and proximal ring faces disposed in spaced relationship to each other along a longitudinal axis. The flange includes a pair of flange faces disposed in spaced relationship to each other along the longitudinal axis. The flange includes outer and inner flange surfaces extending along the longitudinal axis between the pair of flange faces at, respectively, outer and inner flange perimeters thereof. The intermediate portion has a ring end that circumscribes, and is connected to, an outer circumferential ring surface of the ring and a flange end that is connected to the inner flange surface of the flange such that the ring is relatively movable with respect to the flange.

20 Claims, 12 Drawing Sheets

(52) U.S. Cl.
CPC .............. *F16J 3/042* (2013.01); *Y10T 403/31* (2015.01); *Y10T 403/315* (2015.01)

(58) Field of Classification Search
CPC .............. F16C 2326/05; Y10T 403/325; Y10T 403/32729; Y10T 403/31; B60G 7/005; F16D 3/845
USPC .................................................. 277/634, 635
See application file for complete search history.

(56) References Cited

U.S. PATENT DOCUMENTS

| | | | |
|---|---|---|---|
| 3,391,952 A | 7/1968 | Zeigler | |
| 3,476,417 A * | 11/1969 | Born | B60G 7/005 277/398 |
| 3,680,924 A * | 8/1972 | Otto | B62D 55/0887 305/102 |
| 3,897,070 A * | 7/1975 | Anderson | F16J 15/52 277/315 |
| 3,901,518 A * | 8/1975 | Uchida | F16C 11/0671 277/635 |
| 4,034,996 A * | 7/1977 | Manita | B60G 5/053 280/80.1 |
| 4,121,844 A * | 10/1978 | Nemoto | F16C 11/0671 277/635 |
| 4,322,175 A * | 3/1982 | Szczesny | F16B 21/20 277/635 |
| 4,553,760 A * | 11/1985 | Reed | F16C 11/0666 180/9.5 |
| 5,066,159 A | 11/1991 | Urbach | |
| 5,069,571 A * | 12/1991 | Matczak | F16C 11/0614 277/369 |
| 5,318,480 A * | 6/1994 | Essi | F16J 3/048 277/636 |
| 5,439,203 A * | 8/1995 | Hadano | F16F 1/38 248/609 |
| 5,466,084 A * | 11/1995 | Brueggen | F16C 11/0671 277/635 |
| 5,538,275 A * | 7/1996 | Lomnick | B60G 7/005 277/635 |
| 5,544,963 A | 8/1996 | Kajihara et al. | |
| 5,649,779 A | 7/1997 | Martin et al. | |
| 6,022,068 A | 2/2000 | D'Amico | |
| 6,042,294 A * | 3/2000 | Urbach | B60G 3/20 403/122 |
| 6,345,858 B1 | 2/2002 | Franklin et al. | |
| 6,349,470 B1 * | 2/2002 | Sasaki | F16C 11/0614 29/898.062 |
| 6,592,171 B1 | 7/2003 | Hinds | |
| 6,626,575 B2 | 9/2003 | Hartl | |
| 6,764,243 B1 * | 7/2004 | Inuzuka | F16J 3/045 277/634 |
| 6,858,809 B2 | 2/2005 | Bender | |
| 6,866,271 B2 * | 3/2005 | MacDonald | F16J 15/3276 277/353 |
| 6,866,441 B2 * | 3/2005 | Yokoyama | F16C 11/0671 403/122 |
| 7,090,273 B2 | 8/2006 | Stojkovic et al. | |
| 7,100,256 B2 | 9/2006 | D'Amico et al. | |
| 7,261,487 B2 * | 8/2007 | Urbach | B60G 7/005 403/114 |
| 7,481,595 B2 * | 1/2009 | Urbach | B60G 7/005 280/93.511 |
| 7,670,078 B2 * | 3/2010 | Elterman | F16C 11/0671 277/635 |
| 7,704,007 B2 * | 4/2010 | Elterman | F16D 3/845 277/635 |
| 7,708,420 B2 * | 5/2010 | Hartmann, Jr. | F21V 17/18 362/101 |
| 8,622,644 B2 * | 1/2014 | Becker | F16C 11/045 403/134 |
| 8,991,429 B2 * | 3/2015 | Yoshimoto | E02F 9/2004 137/636.1 |
| 9,446,644 B2 * | 9/2016 | Wilcutt | B60G 7/005 |
| 9,562,567 B2 * | 2/2017 | Voisine | F16C 33/74 |
| 2007/0122232 A1* | 5/2007 | Buchner | F16C 11/0614 403/122 |
| 2009/0232589 A1 | 9/2009 | Kuru | |
| 2010/0025950 A1* | 2/2010 | Budde | F16C 11/0671 280/93.511 |
| 2013/0256993 A1 | 10/2013 | Burd et al. | |
| 2014/0050548 A1 | 2/2014 | Loewe et al. | |
| 2014/0099181 A1 | 4/2014 | Giles-Brown et al. | |
| 2014/0175756 A1 | 6/2014 | Ikeda | |
| 2014/0203518 A1 | 7/2014 | Bian et al. | |
| 2015/0322998 A1* | 11/2015 | Lee | F16C 11/0614 403/133 |

FOREIGN PATENT DOCUMENTS

| | | | | |
|---|---|---|---|---|
| JP | 2000-25658 A | | 1/2000 | |
| WO | WO-2004083660 A1 * | | 9/2004 | F16C 11/0628 |

* cited by examiner

SEAL MEMBER FOR JOINT OF MACHINE

CROSS-REFERENCE TO RELATED APPLICATION

This patent application claims the benefit of priority to U.S. Patent Application No. 62/060,390, filed Oct. 6, 2014, and entitled "Seal Member for Joint of Machine," which application is incorporated in its entirety herein by this reference.

TECHNICAL FIELD

This patent disclosure relates generally to a seal member for a joint assembly of a machine and, more particularly, to a seal member for a maintenance-free bearing of a joint assembly of an off-highway machine.

BACKGROUND

Off-highway machines operate in a variety of environments. Such machines can include a chassis having a frame component that is pivotably movable with respect to the chassis which supports one or more ground-engaging devices, such as wheels. The frame component can be pivotably attached to the main chassis by way of a joint assembly having a bearing. Should contaminants, such as mud, infiltrate the bearing, the bearing can become damaged or impaired. For example, should debris accumulate in the bearing, the operation of the bearing can be impaired such that it experiences increased mechanical loads that lead to early failure or damage the bearing. It is desirable to provide a robust seal that protects the bearing from the outside environment.

U.S. Patent Application Publication No. 2014/0203518 is entitled, "Elastomeric Shaft Seal Formed Without Oven Post Curing," and is directed to an elastomeric seal (20), such as a shaft seal for automotive vehicle applications. The elastomeric seal (20) includes an elastomeric compound (22) chemically coupled to a metal sealing ring (24) and is formed without an oven post curing step. The elastomeric seal (20) has an elastic modulus of 6.0 MPa to 13.0 MPa and a tensile strength of 11.1 MPa to 14.8 MPa. The elastomeric compound (22) includes 52.0 to 68.0 wt. % fluoroelastomer, 20.0 to 35.0 wt. % calcium silicate, and 5.0 to 15.0 wt. % diatomite. The elastomeric compound (22) is fully cured and chemically coupled to the metal sealing ring (24) during the compression or injection molding step, and thus an oven post curing step is not required.

It will be appreciated that this background description has been created by the inventors to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

SUMMARY

In an embodiment, the present disclosure describes a seal member for a joint between a pivot member movable about a rotational axis of a shaft. The seal includes a ring, a flange, and an intermediate portion interposed between the ring and the flange.

The ring includes a distal ring face, a proximal ring face, and an outer circumferential ring surface. The distal ring face and the proximal ring face are both annular and are disposed in spaced relationship to each other along a longitudinal axis. The outer circumferential ring surface extends along the longitudinal axis between the distal ring face and the proximal ring face at an outer ring perimeter thereof and circumscribes the distal ring face and the proximal ring face.

The flange is closer to the proximal ring face along the longitudinal axis than to the distal ring face. The flange includes a pair of flange faces disposed in spaced relationship to each other along the longitudinal axis. The flange includes an outer flange surface extending along the longitudinal axis between the pair of flange faces at an outer flange perimeter thereof. The flange includes an inner circumferential flange surface disposed radially within the outer flange surface and extending along the longitudinal axis between the pair of flange faces at an inner flange perimeter thereof. The inner circumferential flange surface defines a flange opening.

The intermediate portion is resiliently flexible. The intermediate portion has a ring end and a flange end. The ring end of the intermediate portion circumscribes, and is connected to, the outer circumferential ring surface of the ring. The flange end of the intermediate portion is connected to the inner circumferential flange surface of the flange such that the ring is relatively movable with respect to the flange.

In another embodiment, a joint assembly for a machine is provided. The joint assembly includes a shaft defining a rotational axis and including a shoulder portion projecting radially therefrom, a pivot member mounted with respect to the shaft such that the pivot member is pivotable about the rotational axis with respect to the shaft, and a seal member mounted to the pivot member and pivotable about the rotational axis with respect to the shaft. The seal member includes a ring, a flange, and an intermediate portion interposed between the ring and the flange along the rotational axis.

The ring includes a distal ring face, a proximal ring face, an inner circumferential ring surface, and an outer circumferential ring surface. The distal ring face and the proximal ring face are both annular and are disposed in spaced relationship to each other along the rotational axis. The inner circumferential ring surface and the outer circumferential ring surface extend along the rotational axis between the distal ring face and the proximal ring face at an inner ring perimeter and an outer ring perimeter thereof, respectively. The inner circumferential ring surface defines a ring opening. The shaft extends through the ring opening. The distal ring face is in contacting relationship with the shoulder portion of the shaft.

The flange is mounted to the pivot member. The flange includes a pair of flange faces disposed in spaced relationship to each other along the rotational axis. The flange includes an inner circumferential flange surface extending along the rotational axis between the pair of flange faces at an inner flange perimeter thereof. The inner circumferential flange surface defines a flange opening. The shaft extends through the flange opening.

The intermediate portion is resiliently flexible. The intermediate portion has a ring end and a flange end. The ring end of the intermediate portion circumscribes, and is connected to, the outer circumferential ring surface of the ring. The flange end of the intermediate portion is connected to the inner circumferential flange surface of the flange such that the ring is relatively movable with respect to the flange. The intermediate portion defines an intermediate passage. The shaft extends through the intermediate passage.

Further and alternative aspects and features of the disclosed principles will be appreciated from the following detailed description and the accompanying drawings. As will be appreciated, the principles related to a seal member for a joint assembly of a machine disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

The present disclosure relates generally to a joint assembly of a machine. In embodiments, the present disclosure relates to a seal member of a joint assembly for a machine. In embodiments, the present disclosure relates to a seal member for a maintenance-free bearing of a joint assembly of an off-highway machine.

In embodiments, a seal member for a joint between a pivot member movable about a rotational axis of a shaft is provided. The seal member can include a ring, a flange, and a resiliently flexible intermediate portion interposed between the ring and the flange. In embodiments, the ring and the flange are both more rigid than the intermediate portion.

In embodiments, the joint assembly includes a shaft defining a rotational axis, a pivot member mounted with respect to the shaft such that the pivot member is pivotable about the rotational axis with respect to the shaft, and a seal member mounted to the pivot member and pivotable about the rotational axis with respect to the shaft. The seal member includes a ring, a flange, and an intermediate portion interposed between the ring and the flange along the rotational axis. The intermediate portion is resiliently flexible, and the ring and the flange are both more rigid than the intermediate portion. In embodiments, a pair of seal members constructed in accordance with principles of the present disclosure is included in the joint assembly with one seal member being mounted to each side of the pivot member via the respective flange.

In embodiments, a bearing can be interposed between the pivot member and the shaft. In embodiments, the bearing can be a maintenance-free bearing which is designed to be used without additional lubricant being applied at the bearing interface after installation.

In embodiments, the ring can be in contacting, proximate relationship with the shaft with a slip fit therebetween such that the ring is pivotable about the rotational axis with respect to the shaft. The seal member can be mounted to the pivot member such that the intermediate portion is compressed along the rotational axis such that the ring is urged away from the pivot member into abutting relationship with a shoulder associated with, and projecting radially from, the shaft.

Figure 1:
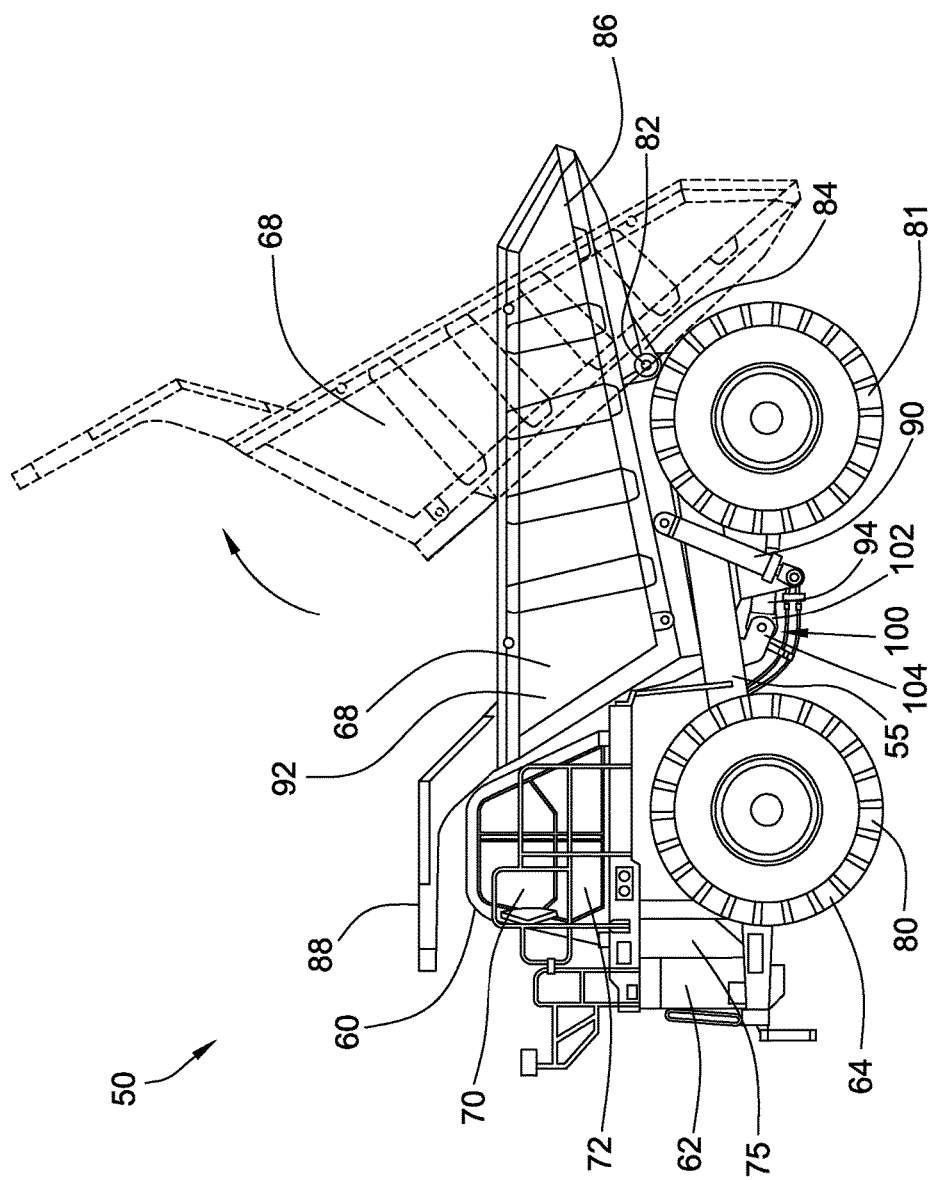
FIG. 1 is a diagrammatic side view of an embodiment of a machine in the form of an off-highway truck suitable for use with an embodiment of a joint assembly having an embodiment of a seal member constructed in accordance with principles of the present disclosure.

Turning now to the Figures, there is shown in FIG. 1 an exemplary embodiment of a machine 50 in the form of an off-highway truck. In the illustrated embodiment, the machine 50 is a large self-propelled off-highway vehicle capable of carrying tons of material in operations such as mining and the like. The machine 50 has a chassis 55 which supports an operator station 60, a power system 62, a drive system 64, and a dump body 68.

In other embodiments, the machine 50 can be any other suitable machine for use with a joint assembly having a seal member constructed in accordance with principles of the present disclosure. Examples of such machines include mobile or fixed machines used for construction, farming, mining, forestry, transportation, and other similar industries. In some embodiments, the machine 50 can be an excavator, wheel loader, backhoe, crane, compactor, dozer, wheel tractor-scraper, material-handling machine, or any other suitable machine which includes a joint assembly with a seal.

The operator station 60 includes controls for operating the machine 50 via the power system 62. The illustrated operator station 60 is configured to define an interior cabin 70 within which the operator controls are housed and which is accessible via a door 72. Specifically, the operator station 60 can include one or more operator interface devices configured for use by a machine operator to maneuver the machine 50 and perform tasks with the machine 50, for example. Examples of operator interface devices include, but are not limited to, a joystick, a steering wheel, and/or a pedal as are well known and understood in the industry.

The power system 62 is configured to supply power to the machine 50. The power system 62 is operably arranged with the operator station 60 to receive control signals from the controls in the operator station 60 and with the drive system 64 and the dump body 68 to selectively operate the drive system 64 and the dump body 68 according to control signals received from the operator station 60. The power system 62 is adapted to provide operating power for the propulsion of the drive system 64 and the operation of the dump body 68 as is understood by those having ordinary skill in the art.

In embodiments, the power system 62 can include an engine, a cooling system or package, a transmission, and a hydraulic system, for example, housed at least in part within an engine compartment 75 supported by the chassis 55. In embodiments, the engine can be any suitable engine, such as, an internal combustion engine, a diesel engine, a gasoline engine, a gaseous fuel-powered engine or any other type of suitable engine. In embodiments, the power system 62 can include a number of engines. The cooling system can be configured to cool the engine(s) of the power system 62.

The hydraulic system can include a plurality of components such as pumps, valves, and conduits, along with a hydraulic fluid reservoir (not shown). The hydraulic system, as well as other systems in the machine, may include its own cooling arrangement.

The dump body 68 defines a storage compartment configured to carry a payload, such as mined material, for example, within it. The dump body 68 is pivotably attached to the chassis 55 by a pair of pivot pins 82 respectively extending through a pair of body supports 84 projecting form the dump body 68 and located toward a rear end 86 of the dump body 12, one on each side of the dump body 68. The pivot pins 82 define a dump body pivot axis about which the dump body 68 can rotate relative to the chassis 55. The dump body 68 is movable over a range of travel between a storage position (shown in FIG. 1) and a fully-inclined dumping position (shown in dashed lines in FIG. 1).

The dump body 68 includes a canopy 88 that extends outwardly from the dump body 68 when the dump body 68 is in the storage position, as shown in FIG. 1. When the dump body 68 is in the storage position, the canopy 88 extends over the operator station 60 and is configured to protect the operator station from debris falling overhead during loading of the dump body 68.

In other embodiments, a different style of dump body 68 can be used. In embodiments, the dump body 68 can include a tailgate at the rear end 86 thereof which is adapted to move between an open position and a closed position.

In embodiments, at least one actuator 90 is provided that is adapted to selectively move the dump body over the range of travel between the storage position and the fully-inclined dumping position. In embodiments, the actuator 90 can be any suitable actuator, such as an extendable cylinder in the form of a hydraulic cylinder or a hydro-pneumatic cylinder, for example, as is well known to those skilled in the art. In embodiments, the machine 50 can include a single extendable cylinder, for example, a pair of extendable cylinders as is customary, or more than two cylinders to selectively pivot the dump body 68.

In the illustrated embodiment, a pair of actuators in the form of extendable cylinders 90 is provided. Each of the extendable cylinders 90 is pivotably connected to a respective side of the chassis 55 and the dump body 68. Each extendable cylinder 90 is moveable over a range of travel between a refracted position (as shown in FIG. 1) and an extended position to place the dump body 68 in the storage position and the fully-inclined position, respectively.

In the illustrated embodiment, when the cylinders 90 are in the retracted position, the dump body 68 is in the storage position for receiving payload therein. When the cylinders 90 are in the extended position, a front end 92 of the dump body 68 is raised relative to the chassis 55 to pivot the dump body 68 about the pivot axis to one of a series of dumping positions up to the fully-inclined dumping position for expelling the payload stored within the dump body 68 from the rear end 86 thereof. This movement of the dump body 68 can be controlled using an operator interface device housed in the operator station 60 in a conventional manner.

The drive system 64 is in operable arrangement with the power system 62 to selectively propel the machine 50 via control signals sent through the operator station 60. The drive system 64 can include a plurality of ground-engaging members, such as, front and rear wheels 80, 81 as shown in the illustrated embodiment. In embodiments, the drive system 64 can be provided in the form of a track-drive system, a wheel-drive system, or any other type of drive system configured to propel the machine 50.

Figure 2:
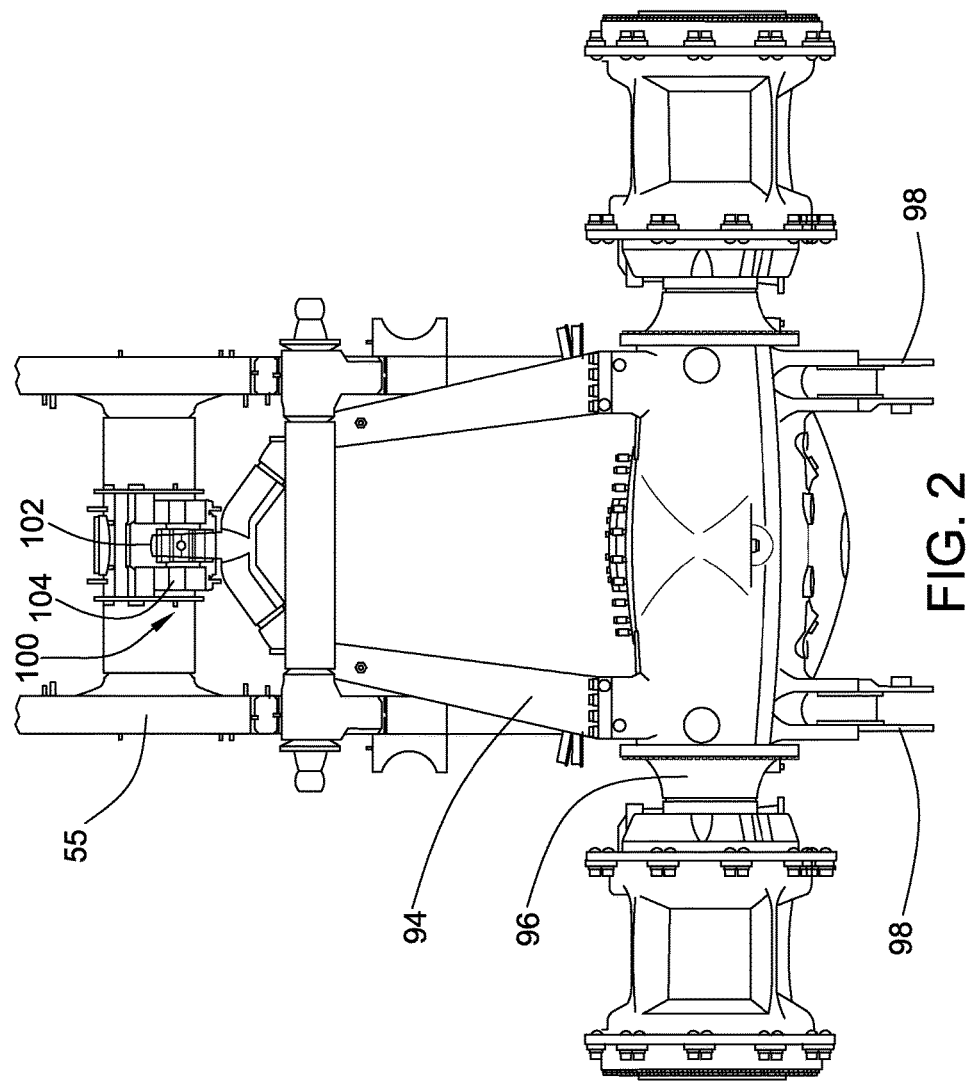
FIG. 2 is a fragmentary, bottom plan view of a chassis of the machine of FIG. 1.

The wheels 80, 81 can be movably connected to the chassis 55 through any suitable means, such as, axles, drive shafts or other components as is well understood in the art. Referring to FIGS. 1 and 2, the rear wheels 81 can be supported by an A-frame 94. The A-frame 94 includes a rear axle 96 that rotatably supports the pair of rear wheels 81 and a pair of suspension mounting brackets 98 adapted to support one end of a suspension system extending between the A-frame 94 and the chassis 55 as is well known in the art. A joint assembly 100 constructed in accordance with principles of the present disclosure is provided to pivotably mount a mounting nose 102 of the A-frame 94 to a fork 104 of the chassis 55.

Figure 3:
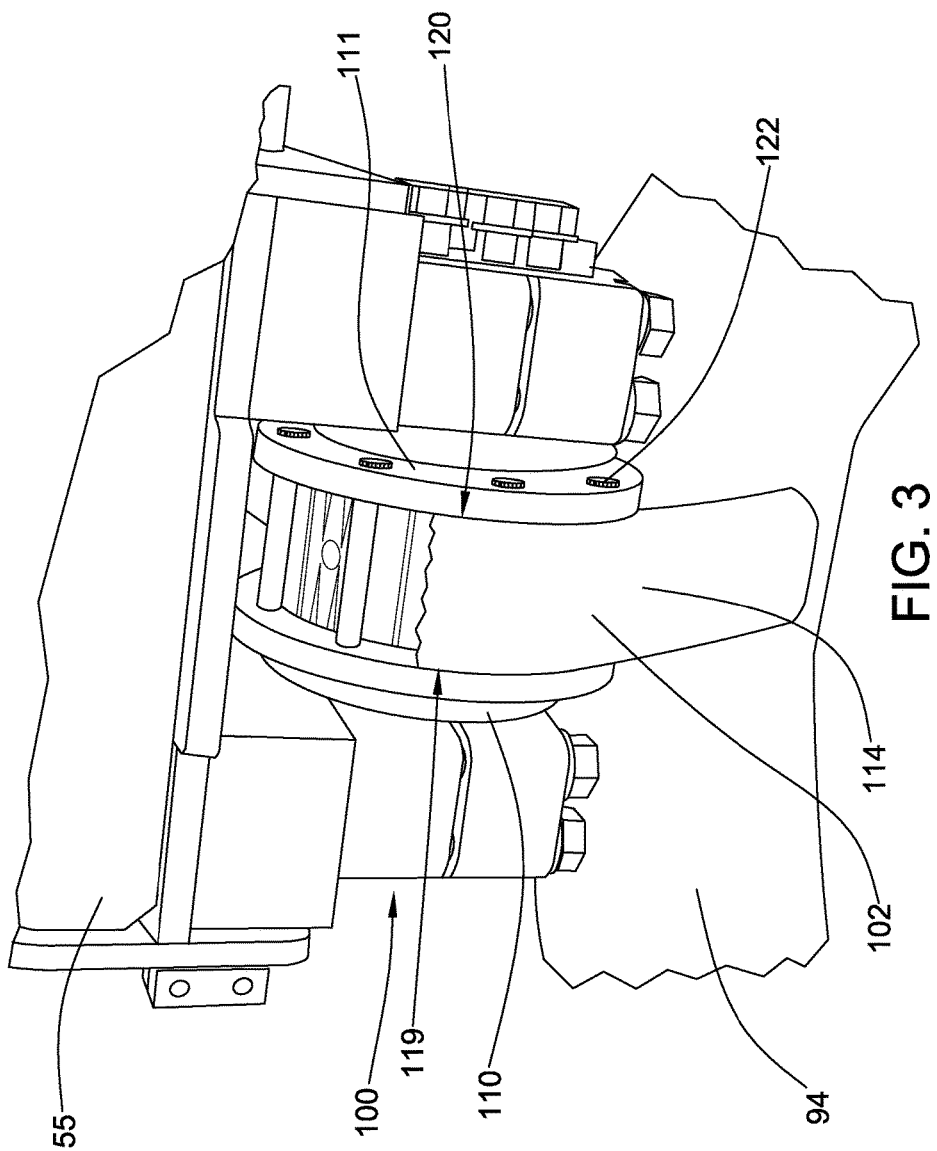
FIG. 3 is an enlarged, fragmentary, perspective view of the joint assembly of FIG. 1.

Referring to FIG. 3, an exemplary embodiment of a joint assembly 100 constructed in accordance with principles of the present disclosure is shown. The joint assembly 100 includes a pair of seal members 110, 111 constructed in accordance with principles of the present disclosure. The joint assembly 100 of FIG. 3 is provided in the machine 50 of FIG. 1 to pivotably mount the mounting nose 102 of the A-frame 94 to the chassis 55 such that the A-frame 94 is pivotably movable with respect to the chassis 55. The A-frame 94 can rotate with respect to the chassis 55 through the movable connection provided by the joint assembly 100. In other embodiments, a joint assembly 100 constructed in accordance with principles of the present disclosure can be used in other machines and can be used in other joint assembly applications, as will be appreciated by one skilled in the art.

Figure 4:
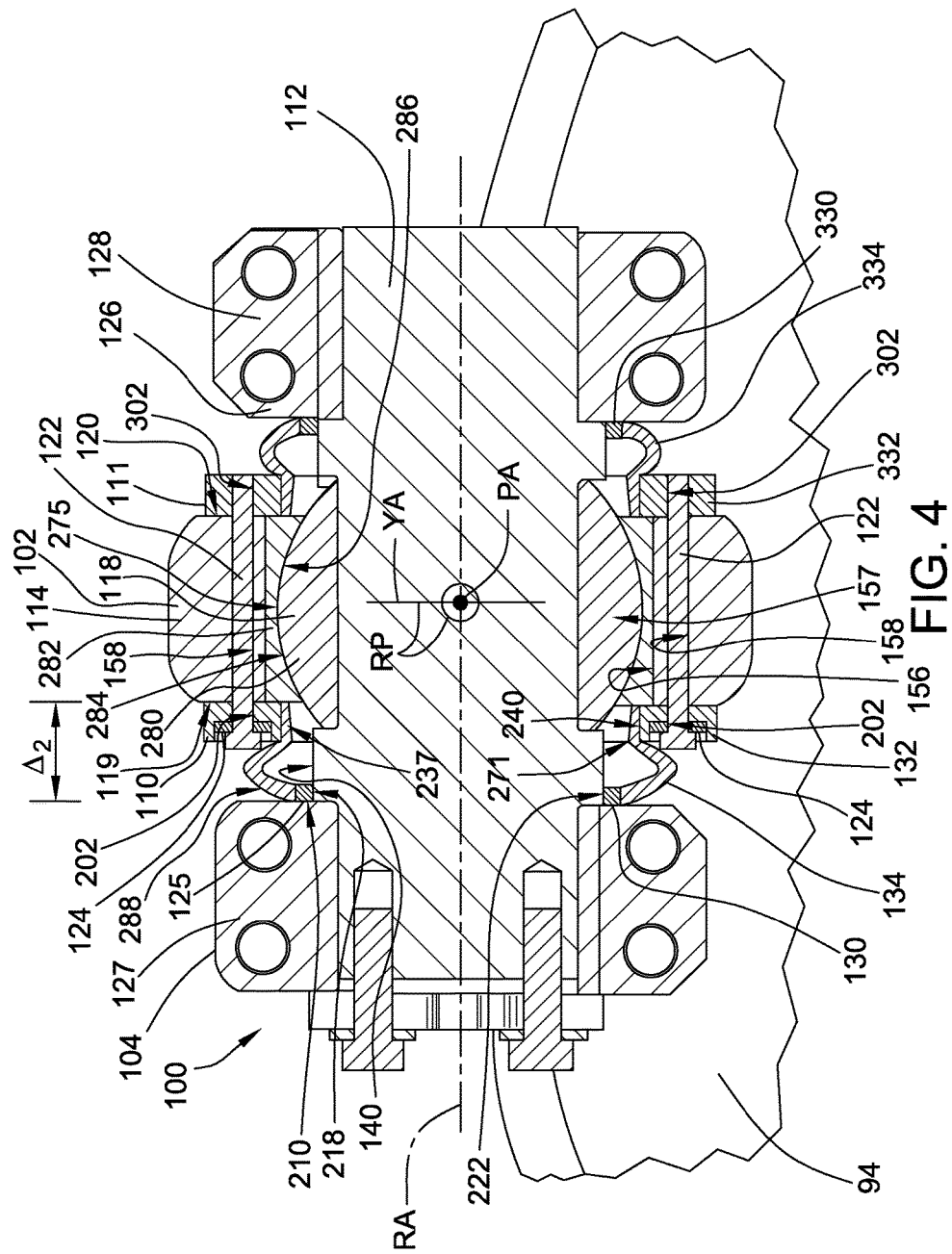
FIG. 4 is a longitudinal sectional view of the joint assembly of FIG. 3.

Referring to FIGS. 3 and 4, the illustrated joint assembly 100 includes first and second seal members 110, 111, a shaft 112 (see FIG. 4), a pivot member 114 in the form of the A-frame 94, and a bearing 118. The first and second seal members 110, 111 are respectively connected to first and second pivot member sides 119, 120 of the pivot member 114, which is the A-frame 94 in the illustrated embodiment.

In the illustrated embodiment, a plurality of fasteners 122 in the form of threaded bolts is used to secure components of the pivot member 114 and to secure the seal members 110, 111 to the pivot member 114. In embodiments, any suitable fastener 122 can be used. The illustrated fasteners 122 include associated washers 124 to help secure the components together (see FIG. 4). In other embodiments, the fasteners 122 can extend beyond the second seal member 111 and nuts can be used to threadingly engage the protruding portion of the fasteners to secure the components together. In still other embodiments, other suitable fastening techniques can be used to connect the first and second seal members 110, 111 to the pivot member 114.

Referring to FIG. 4, the shaft 112 is connected to, and extends between, the fork 104 of the chassis 55 of the machine 50. In other embodiments, the shaft 112 can be mounted to a different component of the machine 50. In embodiments, the shaft 112 can be made from multiple components that can be assembled together from both sides 119, 120 of the pivot member 114.

The shaft 112 defines a rotational axis "RA." The pivot member 114 can rotate with respect to the shaft 112 about the rotational axis "RA."

The shaft 112 includes a pair of shoulder portions 125, 126 projecting radially therefrom. In embodiments, the first and second shoulder portions 125, 126 can be integral with the shaft 112 or can be other components that are coupled to the shaft 112. In the illustrated embodiment, the shoulder portions 125, 126 comprise respective parts of first and second support arms 127, 128 (sometimes referred to as "pillow boxes") of the fork 104 of the chassis 55. The pivot member 114 is interposed between the first and second shoulder portions 125, 126 of the shaft 112.

The pivot member 114 is mounted with respect to the shaft 112 such that the pivot member 114 is pivotable about the rotational axis "RA" with respect to the shaft 112. The first and second seal members 110, 111, which are mounted to the pivot member 114, are also pivotable about the rotational axis "RA" with respect to the shaft 112. In the illustrated embodiment, the pivot member 114 comprises the A-frame 94. In other embodiments, the pivot member 114 of the joint assembly 100 can be a different component or device, as will be appreciated by one skilled in the art.

The bearing 118 is interposed between the shaft 112 and the pivot member 114. In the illustrated embodiments, the bearing 118 is a spherical plain bearing. In embodiments, the bearing 118 can comprise a bearing which is sometimes referred to as a "maintenance-free" bearing inasmuch as additional lubricant is not applied at the bearing interface after installation. In embodiments, the bearing 118 can be any suitable type of bearing.

Referring to FIG. 4, the first seal member includes a ring 130 (see, e.g., FIGS. 5 and 6), a flange 132, and an intermediate portion 134 interposed between the ring 130 and the flange 132 along the rotational axis "RA." The flange 132 is adjacent the pivot member 114 and fixed relative to the pivot member 114 via the fasteners 122. The flange 132 is connected to the pivot member 114 such that the seal member 110 is movable relative to the shaft 112 about the rotational axis "RA."

The intermediate portion 134 is resiliently flexible. The intermediate portion 134 can be configured such that it has an axial length "$\Delta_1$" along the rotational axis "RA" (see FIG. 6) that is greater than an axial length "$\Delta_2$" along the rotational axis "RA" between the first side 119 of the pivot member 114 and the first shoulder portion 125 such that the intermediate portion 134 is compressed therebetween. The intermediate portion 134 acts in the manner of a spring to urge the ring 130 into contacting engagement with the first shoulder portion 125 to provide a running seal therebetween. The ring 130 is ring proximate relationship with an exterior surface 140 of the shaft 112 with a slip fit therebetween such that the ring 130 is pivotable about the rotational axis "RA" with respect to the shaft 112.

The second seal member 111 is similar in construction to the first seal member 110 and has a ring 330, a flange 332, and an intermediate portion 334. The ring 330 and the intermediate portion 334 of the second seal member 111 are substantially similar in construction and function to the ring 130 and the intermediate portion 134 of the first seal member 110. The flange 332 of the second seal member 111 has a mounting arrangement that is different from that of the first seal member 110, as explained below. The second seal member 111 is similar in other respects to the first seal member 110, and it should be understood that the description of the first seal member 110 is generally applicable to the second seal member 111, as well.

The illustrated pivot member 114 comprises an A-frame 94 having a mounting nose 102. The mounting nose 102 includes an inner circumferential mounting nose surface 156 that defines a mounting passage 157 therethrough. The mounting passage 157 is configured to accept therein the shaft 112 and the bearing 118. The bearing 118 can be disposed within the mounting passage 157 such that the bearing is interposed between the mounting nose 102 of the A-frame 94 and the shaft 112. The mounting nose 102 can include a plurality of fastener passages 158 configured to align with corresponding mounting holes of other components of the joint assembly 100 to accept the fasteners 122 therethrough.

The flange 132 of the first seal member 110 is connected to the first pivot member side 119 of the pivot member 114. The flange 132 can include a plurality of seal member mounting holes 202 configured to align with corresponding mounting holes of other components of the joint assembly 100 to accept the fasteners 122 therethrough.

The flange 332 of the second seal member 111 is connected to the second pivot member side 120 of the pivot member 114. The flange 332 can include a plurality of seal member mounting holes 302 configured to align with corresponding mounting holes of other components of the joint assembly 100 to accept the fasteners 122 therein.

The first and second seal members 110, 111 are respectively disposed adjacent the first and second pivot member sides 119, 120 of the pivot member 114. The seal members 110, 111 at least partially occlude the mounting passage 157 from the first and second pivot member sides 119, 120, respectively, to help retain the bearing 118 within the mounting passage 157 of the mounting nose 102.

Figure 5:
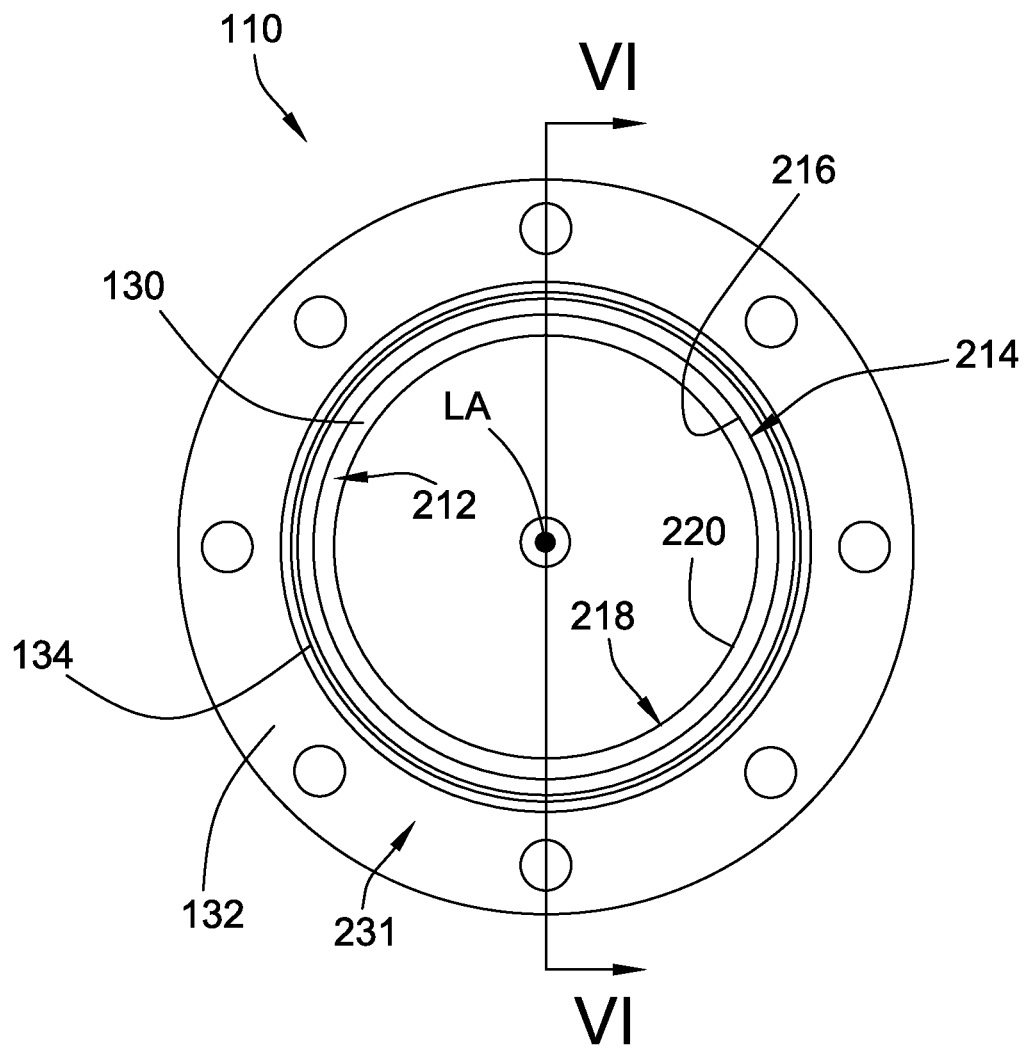
FIG. 5 is a mounting end plan view of a first seal member, which is constructed in accordance with principles of the present disclosure and is suitable for use in the joint assembly of FIG. 3.
Figure 6:
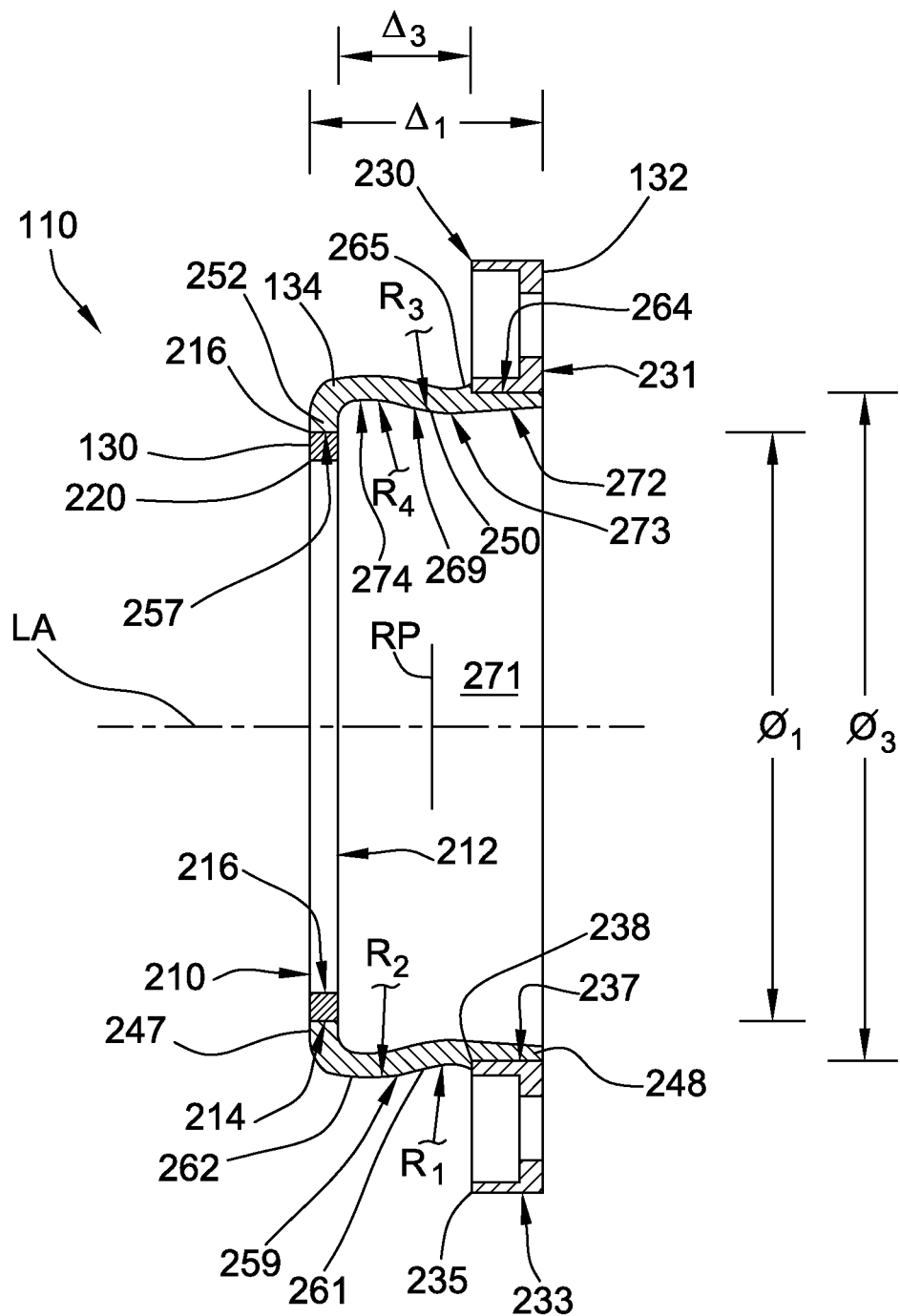
FIG. 6 is a cross-sectional view of the seal member of FIG. 5 taken along the line VI-VI in FIG. 5.

Referring to FIGS. 5 and 6, an exemplary embodiment of a seal member 110 constructed in accordance with principles of the present disclosure is shown. The seal member 110 can be included in a joint assembly 100 constructed in accordance with principles of the present disclosure. The seal member 110 of FIGS. 5 and 6 is used in the joint assembly 100 of FIGS. 3 and 4 for the machine 50 of FIG. 1 to pivotably mount the A-frame 94 to the chassis 55. In other embodiments, a seal member 110 constructed in accordance with principles of the present disclosure can be used in other joint assemblies and/or machines and can be used in other seal member applications, as will be appreciated by one skilled in the art.

The illustrated seal member 110 includes the ring 130, the flange 132, and the intermediate portion 134 interposed between the ring 130 and the flange 132. In embodiments, the intermediate portion 134 is resiliently flexible, and the ring 130 and the flange 132 are both more rigid than the intermediate portion 134.

In embodiments, individual pieces of the seal member 110 can be constructed from materials different from the other components of the seal member 110. In embodiments, the ring 130 is made from nylon, the flange 132 is made from steel, and the intermediate portion 134 is made from rubber. In other embodiments, the materials used to construct the seal member 110 can be varied. Preferably, the materials used to construct the seal member 110 are non-reactive with common contaminants, such as mud, which may adhere to the pivot member and/or the seal member 110.

The ring 130 can be made from any suitable material, such as a suitable nylon, for example. In embodiments, the ring 130 is made from a material that is harder and more rigid than the material from which the intermediate portion 134 is made. In embodiments, the ring 130 can be made from a material that is suitably rigid to help prevent the intermediate portion 134 from buckling when the seal member 110 is in a predetermined misaligned position.

The flange 132 can be made from any suitable material, such as metal, for example. In embodiments, the flange 132 is made from steel. In embodiments, the flange 132 is made from a material that is harder and more rigid than the material from which the intermediate portion 134 is made.

The intermediate portion 134 can be made from any suitable material, such as an elastomeric material, for example. In embodiments, the intermediate portion 134 is made from natural rubber. In other embodiments, the intermediate portion 134 may be made from other suitable materials including, for example, ethylene propylene diene monomer (EPDM), nitrile rubber, polyurethane, and styrene-butadiene rubber (SBR). Other suitable elastomers may be used in other embodiments. In embodiments, the intermediate portion 134 is made from a material which has a suitable flexibility to provide the ability of the ring 130 to move relative to the flange 132 with at least two degrees of freedom. In embodiments, the intermediate portion 134 is made from a material such that the ring 130 and the flange 132 are both more rigid than the intermediate portion 134. In embodiments, the intermediate portion is made from a material that is suitably resiliently compressible such that an adequate seal is provided between the ring 130 and the shoulder portion 125 projecting from the shaft 112 of the joint assembly 100 within which the seal member 110 is used and that permits relative movement of the ring 130 and the flange 132 over an intended operational range of motion therebetween.

Referring to FIGS. 5, 6, 9, and 10, the ring 130 can be provided to help prevent the intermediate portion 134 from buckling when the joint assembly 100 is in a misaligned condition. The ring 130 can be adapted to help prevent mud and other contaminants from entering the mounting passage 157, which houses the bearing 118, from the first pivot member side 119.

The ring 130 of the seal member 110 includes a distal ring face 210 and a proximal ring face 212. The distal ring face 210 and the proximal ring face 212 are both annular and are disposed in spaced relationship to each other along a longitudinal axis "LA" of the seal member 110. When the seal member 110 is mounted to the pivot member 114 in the joint assembly 100, the longitudinal axis "LA" of the seal member 110 is substantially aligned with, and parallel to, the rotational axis "RA" of the shaft 112 when the joint assembly 100 is in a normal condition. As such, spatial relationships described herein using the longitudinal axis "LA" are applicable to the rotational axis "RA," as well, and vice versa.

Figure 9:
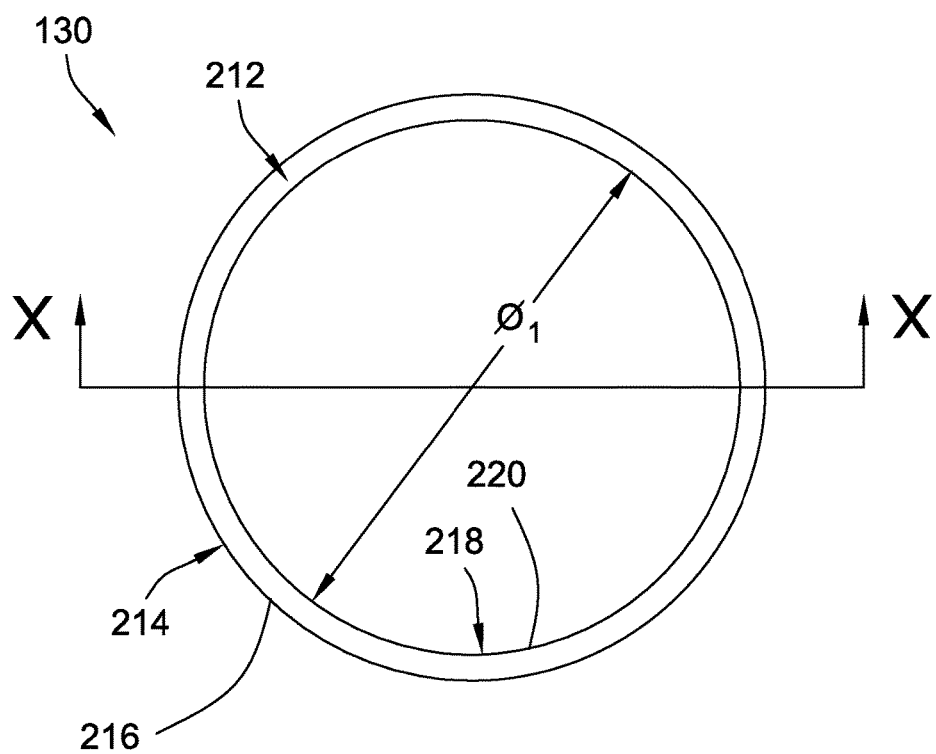
FIG. 9 is a mounting end plan view of a ring of the seal member of FIG. 5.
Figure 10:
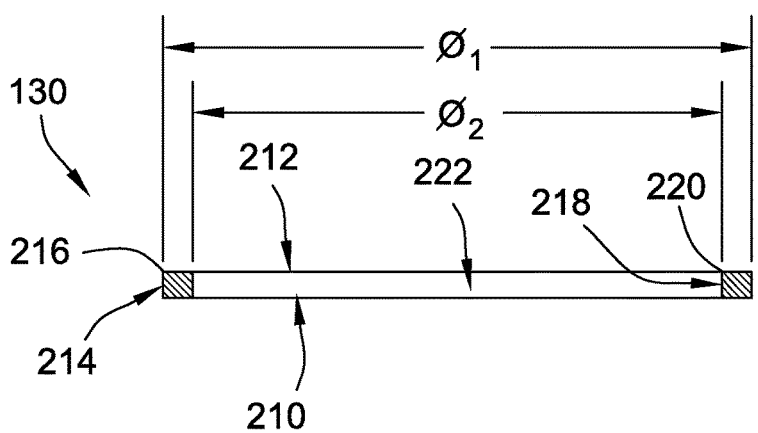
FIG. 10 is a cross-sectional view of the ring of FIG. 9 taken along the line X-X in FIG. 9.

Referring to FIGS. 6, 9, and 10, the ring 130 includes an outer circumferential ring surface 214 extending along the longitudinal axis "LA" between the distal ring face 210 and the proximal ring face 212 at an outer ring perimeter 216 thereof. The outer circumferential ring surface 214 circumscribes the distal ring face 210 and the proximal ring face 212. The outer circumferential ring surface 214 defines an outer ring diameter "$\varnothing_1$" (see FIG. 10).

The ring 130 includes an inner circumferential ring surface 218 extending along the longitudinal axis "LA" between the distal ring face 210 and the proximal ring face 212 at an inner ring perimeter 220 thereof. The inner ring perimeter 220 and the inner circumferential ring surface 218 define a ring opening 222 having an inner ring diameter "$\varnothing_2$" (see FIG. 10).

The ring opening 222 can be configured to allow the shaft 112 to extend therethrough. In embodiments, the ring opening 222 is sized relative to the exterior surface 140 of the shaft 112 such that there is a slip fit therebetween in which the inner circumferential ring surface 218 is rotatable with respect to the exterior surface 140 of the shaft 112 about the rotational axis "RA" of the shaft 112.

Referring to FIGS. 5-8, the flange 132 can be provided to connect the seal member 110 to the pivot member 114 such that the flange 132 is fixed relative to the pivot member 114. The flange 132 is closer to the proximal ring face 212 along the longitudinal axis "LA" than to the distal ring face 210 (see FIG. 6). The flange 132 includes a pair of flange faces 230, 231 disposed in spaced relationship to each other along the longitudinal axis "LA." Referring to FIG. 6, the ring 130 is disposed in spaced relationship to the flange 132 along the longitudinal axis "LA" such that the proximal ring face 212 is disposed a longitudinal offset distance "$\Delta_3$" from the distal flange face 230 of the flange 132 which is the flange face that is closer to the ring 130 along the longitudinal axis "LA."

The flange 132 includes an outer flange surface 233 extending along the longitudinal axis "LA" between the pair of flange faces 230, 231 at an outer flange perimeter 235 thereof. The flange 132 includes an inner circumferential flange surface 237 extending along the longitudinal axis "LA" between the pair of flange faces 230, 231 at an inner flange perimeter 238 thereof. The inner circumferential flange surface 237 is disposed radially within the outer flange surface 233.

Figure 7:
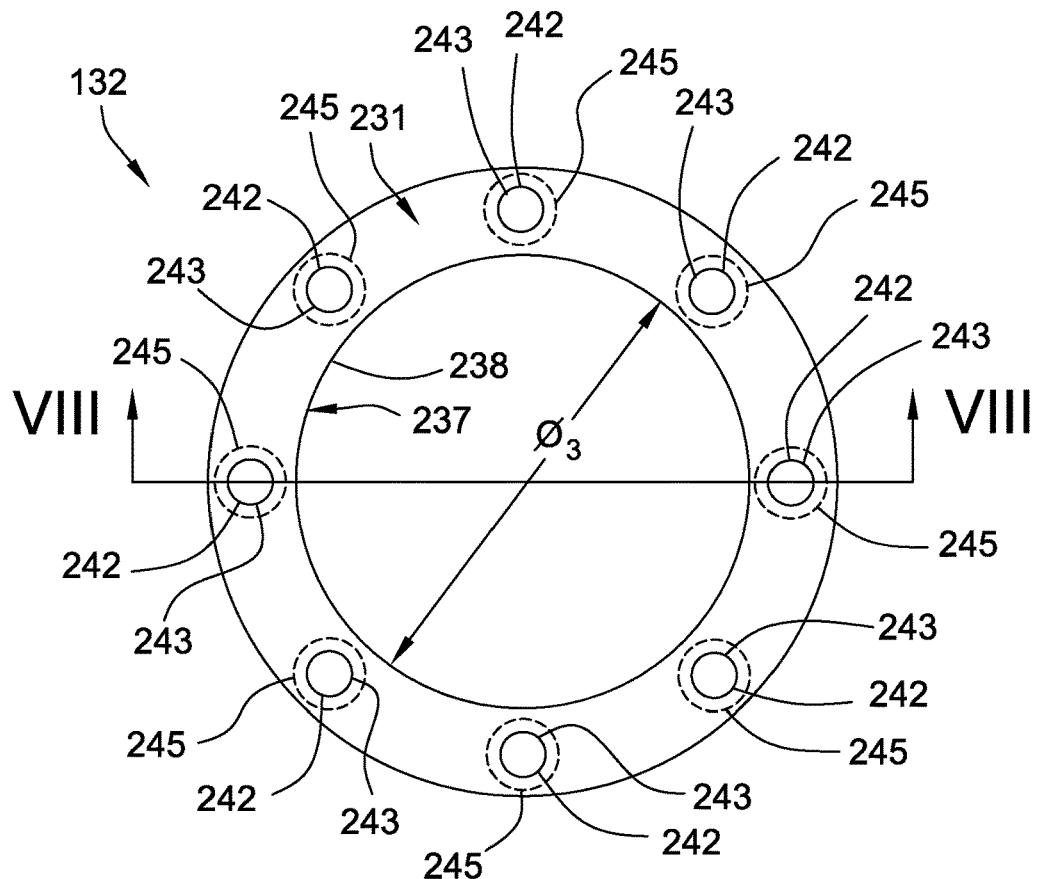
FIG. 7 is a mounting end plan view of a flange of the seal member of FIG. 5.
Figure 8:
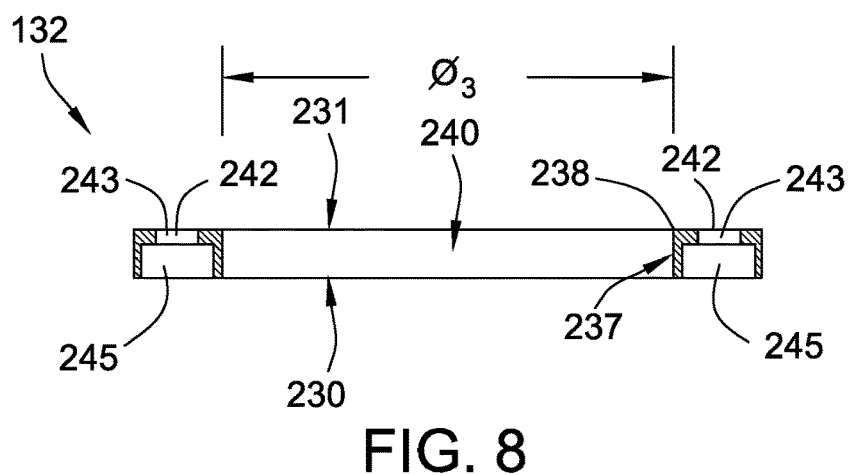
FIG. 8 is a cross-sectional view of the flange of FIG. 7 taken along the line VIII-VIII in FIG. 7.

Referring to FIGS. 7 and 8, the inner flange perimeter 238 and the inner circumferential flange surface 237 defines a flange opening 240 having an inner flange diameter "$\varnothing_3$." The flange opening 240 can be configured to allow the shaft 112 to extend therethrough. In embodiments, the outer ring diameter "$\varnothing_1$" of the ring 130 is less than the inner flange diameter "$\varnothing_3$" of the flange 132 (see FIG. 6).

Referring to FIGS. 7 and 8, the flange 132 can define at least one seal member mounting hole 242 configured to receive a fastener 122 therethrough for connecting the flange 132 to the pivot member 114. In embodiments, the flange 132 defines at least one seal member mounting hole 242 extending along the longitudinal axis "LA" between the flange faces 230, 231. In the illustrated embodiment, the flange 132 includes eight seal member mounting holes 242 disposed in evenly spaced radial relationship to each about the flange faces 230, 231. The seal member mounting holes 242 can each receive a fastener 122 therethrough to connect the seal member 110 to the pivot member 114.

The illustrated seal member mounting holes 242 of the first seal member 110 include a mounting hole passage 243 and a counterbore 245. The counterbore 245 is radially larger than the mounting hole passage 234. The counterbore 245 is disposed adjacent the distal flange face 230.

Referring to FIGS. 5 and 6, the intermediate portion 134 can be adapted to allow the ring 130 to be movable relative to the flange 132 with at least two degrees of freedom. In embodiments, the intermediate portion 134 can help maintain the ring 130 in abutting relationship with the shoulder portion 125 projecting from the shaft 112.

Referring to FIG. 7, the intermediate portion 134 is connected to the ring 130 and to the flange 132. The intermediate portion 134 is resiliently flexible such that the ring 130 is movable with respect to the flange 132 with at least two degrees of freedom. In embodiments, the ring 130 can rotate about the longitudinal axis "LA" with respect to the flange 132, and the ring 130 can translate along the longitudinal axis "LA" with respect to the flange 132. In embodiments, the ring 130 can also move relative to a radial plane "RP," which is perpendicular to the longitudinal axis "LA," with respect to the flange 132 with at least two degrees of freedom. The intermediate portion 134 can flex in response to the relative movement between the ring 130 and the flange 132 to dissipate the forces generated by multiple motions of the joint (e.g., rotation, misalignment, and out of plane motion) and to resist fluid pressure exerted due to mud packing from outside the seal member 110.

The intermediate portion 134 can be configured to accommodate the relative translation of the ring 130 along a radial plane "RP" which is perpendicular to the longitudinal axis "LA." The ring 130 can be adapted to accommodate the shaft 112 therewithin over a range of relative rotation between the ring 130 and the shaft 112 about the longitudinal axis "LA," for example, over a range of about fifteen degrees, over a range of about ten degrees in other embodiments, or over a range of about five degrees in still other embodiments.

Referring to FIG. 6, the intermediate portion 134 includes a ring end 247 and a flange end 248. In the illustrated embodiment, the ring end 247 of the intermediate portion 134 circumscribes and is connected to the outer circumferential ring surface 214 of the ring 130. The flange end 248 of the intermediate portion 134 is connected to the inner circumferential flange surface 237 of the flange 132 such that the ring 130 is relatively movable with respect to the flange 132. Any suitable technique can be used to connect the components of the seal member 110, such as, by being bonded together by adhesive, for example.

In embodiments, an adhesive can be used to connect the flange 132 and the intermediate portion 134. In embodiments, the adhesive used to bond the intermediate portion 134 to the flange 132 is compatible with the materials from which the flange 132 and the intermediate portion 134 are made (e.g., steel and natural rubber, respectively). In embodiments, an adhesive can be used to connect the ring 130 and the intermediate portion 134. In embodiments, the adhesive used to bond the intermediate portion 134 to the ring 130 is compatible with the materials from which the ring 130 and the intermediate portion 134 are made (e.g., nylon and natural rubber, respectively). In embodiments, the adhesive used to bond the intermediate portion 134 to the flange 132 is different from the adhesive used to bond the intermediate portion 134 to the ring 130.

Referring to FIG. 6, the intermediate portion includes an axial segment 250, extending along the longitudinal axis "LA," and a radial segment 252, extending from the axial segment 250 radially inwardly along a radial plane "RP" perpendicular to the longitudinal axis "LA." The axial segment 250 of the intermediate portion 134 includes the flange end 248. The flange end 248 is annular and is connected to the inner circumferential flange surface 237 of the flange 132. The radial segment 252 of the intermediate portion 134 includes the ring end 247 and has an inner circumferential radial surface 257 disposed radially within the axial segment 250 of the intermediate portion 134. The inner circumferential radial surface 257 of the intermediate portion 134 circumscribes, and is connected to, the outer circumferential ring surface 214 of the ring 130.

The intermediate portion includes an outer surface 259 that includes a concave outer part 261 and a convex outer part 262. The concave outer part 261 is annular and is disposed along the axial segment 250 adjacent the flange end 248. The convex outer part 262 is annular and is disposed along the axial segment 250 adjacent the radial segment 25 such that the concave outer part 261 is interposed between the flange end 248 and the convex outer part 262 along the axial segment. The convex outer part 262 projects radially outwardly relative to the concave outer part 261.

The concave outer part 261 has a first radius "$R_1$" of curvature. The convex outer part 262 has a second radius "$R_2$" of curvature. In embodiments, the second radius "$R_2$" of curvature is larger than the first radius "$R_1$" of curvature. In embodiments, a ratio of the second radius "$R_2$" of curvature to the first radius "$R_1$" of curvature is in a range between greater than 1 and 5, in a range between greater than 1 and 3 in still other embodiments, and between greater than 1 and 2 in yet other embodiments.

The outer surface 259 of the intermediate portion 134 includes a cylindrical outer part 264 and a flange shoulder 265. The cylindrical outer part 264 is disposed at the flange end 248 and is connected to the inner circumferential flange surface 237 of the flange 132. The cylindrical outer part 264 extends along the longitudinal axis "LA" between the proximal flange face 231 and the distal flange face 230. The flange shoulder 265 is disposed adjacent the cylindrical outer part 264 and projects radially outwardly therefrom such that the flange shoulder 265 is in engaging, radially overlapping relationship with the distal flange face 230.

The intermediate portion 134 includes an inner surface 269. The inner surface 269 defines an intermediate passage 271. The intermediate passage 271 can be configured to all the shaft 112 to extend therethrough.

The inner surface 269 includes an inner taper part 272 disposed along the axial segment 250 at the flange end 248. The inner taper part 272 is frusto-conical and converges radially inwardly in a direction from the flange 132 to the ring 130. The inner surface 269 includes a convex inner part 273 and a concave inner part 274. The convex inner part 273 is interposed between the concave inner part 274 and the inner taper part 272. The convex inner part 273 is annular and projects radially inwardly. The concave inner part 274 is annular and projects radially outwardly relative to the convex inner part 273.

The convex inner part 273 has a third radius "$R_3$" of curvature. The concave inner part 274 has a fourth radius "$R_4$" of curvature. In embodiments, the second radius "$R_2$" of curvature is larger than the third radius "$R_3$" of curvature, the third radius "$R_3$" of curvature is larger than the first radius "$R_1$" of curvature, and the fourth radius "$R_4$" of curvature is larger than the second radius "$R_2$" of curvature. In embodiments, the fourth radius "$R_4$" of curvature is larger than the third radius "$R_3$" of curvature. In embodiments, a ratio of the fourth radius "$R_4$" of curvature to the third radius "$R_3$" of curvature is in a range between greater than 1 and 5, in a range between greater than 1 and 3 in still other embodiments, and between greater than 1 and 2 in yet other embodiments.

In the illustrated embodiment, the convex inner part 273 is aligned with the concave outer part 261 along the longitudinal axis "LA." The concave inner part 274 is aligned with the convex outer part 262 along the longitudinal axis "LA."

Figure 11:
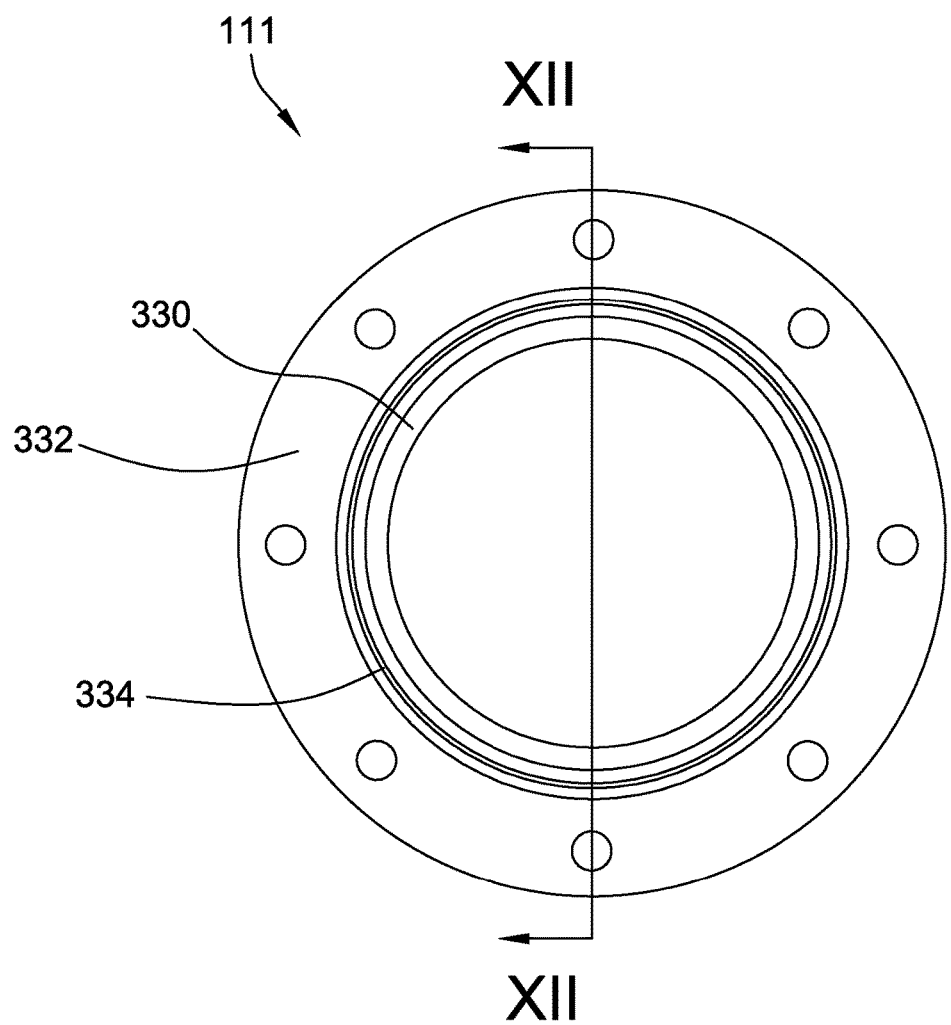
FIG. 11 is a mounting end plan view of a second seal member, which is constructed in accordance with principles of the present disclosure and is suitable for use in the joint assembly of FIG. 3.
Figure 12:
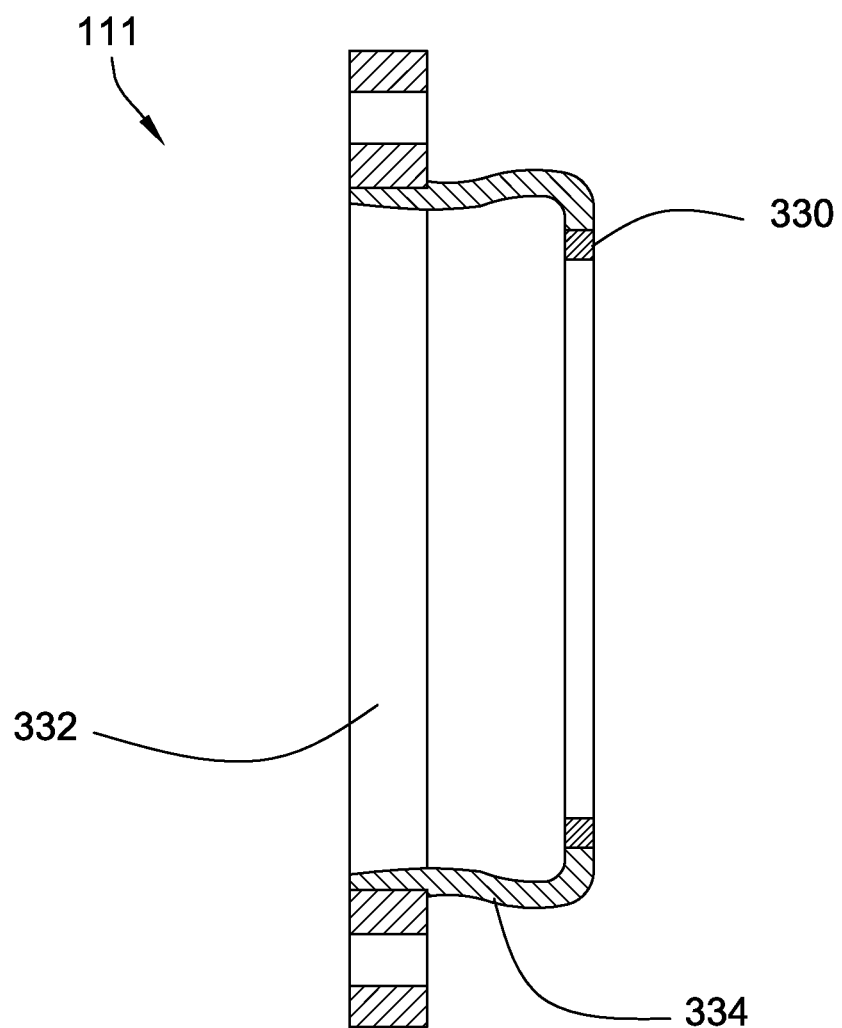
FIG. 12 is a cross-sectional view of the seal member of FIG. 11 taken along the line XII-XII in FIG. 11.
Figure 13:
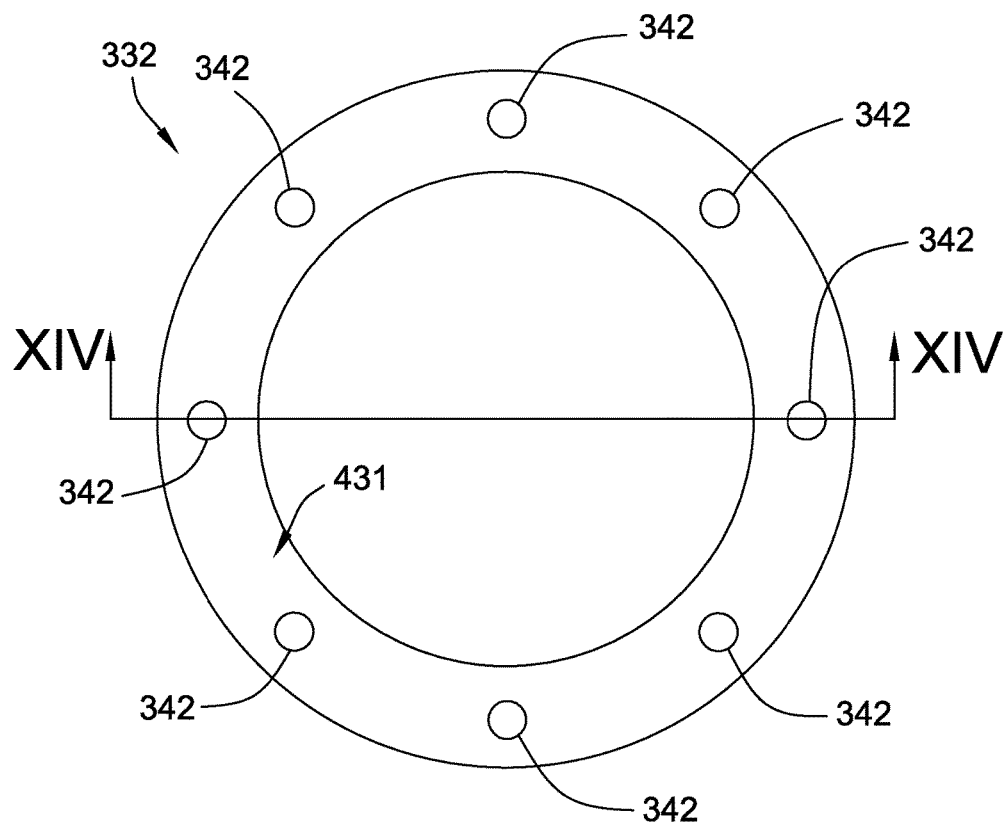
FIG. 13 is a mounting end plan view of a flange of the seal member of FIG. 11.

Referring to FIGS. 11 and 12, an exemplary embodiment of a seal member 111 constructed in accordance with principles of the present disclosure is shown. The seal member 111 can be included in a joint assembly 100 constructed in accordance with principles of the present disclosure. The seal member 111 of FIGS. 11 and 12 is used in the joint assembly 100 of FIGS. 3 and 4 for the machine 50 of FIG. 1 to pivotably mount the A-frame 94 to the chassis 55. In other embodiments, a seal member 111 constructed in accordance with principles of the present disclosure can be used in other joint assemblies and/or machines and can be used in other seal member applications, as will be appreciated by one skilled in the art.

The illustrated second seal member 111 includes the ring 330, the flange 332, and the intermediate portion 334 interposed between the ring 330 and the flange 332. In embodiments, the intermediate portion 334 is resiliently flexible, and the ring 330 and the flange 332 are both more rigid than the intermediate portion 334.

Referring to FIGS. 9-12, the flange 332 can be provided to connect the seal member 111 to the second side 120 of the pivot member 114 such that the flange 332 is fixed relative to the pivot member 114. Referring to FIGS. 11 and 12, the flange 332 can define at least one seal member mounting hole 442 configured to receive a fastener 122 therein for connecting the flange 332 to the pivot member 114. In embodiments, the flange 332 defines at least one seal member mounting hole 442 extending along the longitudinal axis "LA" between the flange faces 430, 431. In the illustrated embodiment, the flange 332 includes eight seal member mounting holes 342 disposed in evenly spaced radial relationship to each about the flange faces 430, 431. The seal member mounting holes 342 can each receive a fastener 122 therein to connect the seal member 111 to the pivot member 114.

Figure 14:
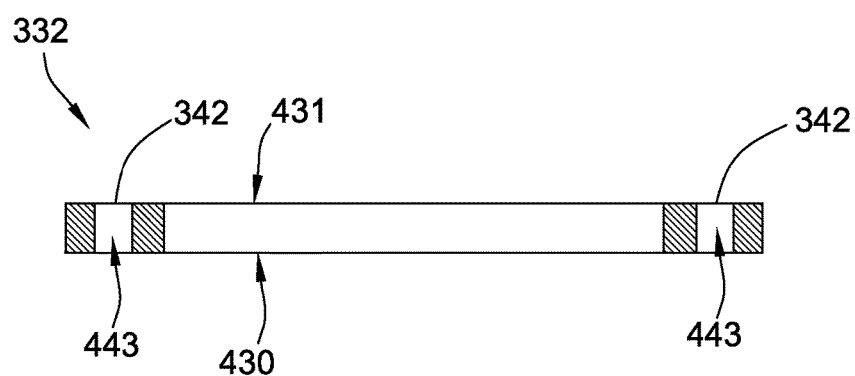
FIG. 14 is a cross-sectional view of the flange of FIG. 13 taken along the line XIV-XIV in FIG. 13.

Referring to FIG. 14, the illustrated seal member mounting holes 342 of the second seal member 111 include a mounting hole passage 443 that extends along the longitudinal axis "LA" between the flange faces 430, 431 with the same diameter. In embodiments, the mounting hole passage 443 can include a threaded surface that is configured to retentively engage a complementary threaded surface on a distal end of a fastener 122 to connect the second seal member 111 to the pivot member 114. In other embodiments, the mounting hole passage 443 can be configured to allow a distal end of a fastener to project therefrom out beyond the proximal flange face 431 to allow a nut to be used in the connection. The second seal member 111 of FIGS. 11 and 12 can be similar in other respects to the first seal member 110 of FIGS. 5 and 6.

Referring to FIG. 4, the bearing 118 is provided to facilitate the relative movement of the pivot member 114 and the shaft 112. The bearing 118 defines a bearing interface 275 about which the pivot member 114 is pivotable with respect to the shaft 112.

The illustrated bearing 118 includes an inner ring bearing member 280 and an outer race bearing member 282. The inner ring bearing member 280 has a spherically convex exterior bearing surface 284. The inner ring bearing member 280 is configured to be mounted to the shaft 112. Any suitable technique can be used to couple the inner ring bearing member 280 to the shaft 112 such that the inner ring bearing member 280 is coupled with the shaft 112.

The outer race bearing member 282 is attached to the mounting nose 155 of the extendable cylinder 90. The outer race bearing member 282 is disposed within the inner circumferential mounting nose surface 156.

The outer race bearing member 282 has a spherically concave interior bearing surface 286 defining a cavity therewithin. The concave interior bearing surface 286 of the outer race bearing member 282 includes a shape that is complementary to the shape of the convex exterior bearing surface 284 of the inner ring bearing member 280.

The inner ring bearing member 280 is disposed within the cavity of the outer race bearing member 282 with the spherically concave interior bearing surface 286 of the outer race bearing member 282 concentrically circumscribing the spherically convex exterior bearing surface 284 of the inner ring bearing member 280. The spherically convex exterior bearing surface 284 of the inner ring bearing member 280 and the spherically concave interior bearing surface 286 of the outer race bearing member 282 define the bearing interface 275.

In embodiments, seals (such as those shown and described in U.S. Pat. No. 6,626,575, for example) can be provided on both sides of the outer race bearing member 282 that help seal the bearing interface 275. In embodiments, one or both of the convex exterior bearing surface 284 of the inner ring bearing member 280 and the concave interior bearing surface 286 of the outer race bearing member 282 can have a friction-reducing liner applied thereto. In embodiments, the friction-reducing liner can be made from any suitable material, such as, PTFE, for example.

Referring to FIG. 4, the joint assembly 100 is shown in an assembled position. The shaft 112 extends through the rings 130, 330, the intermediate portions 134, 334, and the flanges 132, 332 of the first and second seal members 110, 111. With respect to the first seal member 110, the shaft 112 extends through the ring opening 222 of the ring 130, the intermediate passage 271 of the intermediate portion 134, and the flange opening 240 of the flange 132. The second seal member 111 has a similar relationship with respect to the shaft 112. The shaft 112 is disposed within the mounting passage 157 of the pivot member 114. The inner ring bearing member 280 of the bearing 118 is connected to the shaft 112.

The bearing 118 is interposed between the shaft 112 and the pivot member 114. The bearing 118 is mounted to the shaft 112 and to the mounting nose 102 of the pivot member 114 such that the outer race bearing member 282 is relatively movable with respect to the inner ring bearing member 280 about the bearing interface 275.

The bearing 118 allows the pivot member 114 to move with respect to the shaft 112 about the rotational axis "RA" and in an out-of-plane movement relative to a radial plane "RP" that is perpendicular to the rotational axis "RA." The radial plane "RP" can be defined by a pitch axis "PA" and a yaw axis "YA," which are mutually perpendicular to the rotational axis "RA" and to each other. Out-of-plane movement can occur about one or both of the pitch axis "PA" and the yaw axis "YA."

The flanges 132, 332 of the seal members 110, 111 are fixed relative to the pivot member 114. The flanges 132, 332 of the first and second seal members 110, 111 can be configured such that the inner circumferential flange surfaces 237 are disposed radially within the inner circumferential mounting nose surface 156 when the flanges 132, 332 are mounted to the pivot member 114. The projecting annular portion of the flanges 132, 332 which are in occluding relationship with the mounting passage 157 can be placed in interfering relationship with the bearing 118 disposed within the mounting passage 157 to inhibit relative movement of the bearing 118 along the rotational axis "RA" both toward the flange 132 of the first seal member 110 with respect to the mounting nose 102 of the pivot member 114 and toward the flange 332 of the second seal member 111 with respect to the mounting nose 102 of the pivot member 114.

The intermediate portions 134, 334 of the first and second seal members 110, 111 can help maintain the rings 130, 330 in contacting engagement with the first and second shoulder portions 125, 126, respectively. The intermediate portions 134, 334 can accommodate angular misalignment between the pivot member 114 and the shaft 112 while maintaining the contacting relationship between the rings 130, 330 and the shoulder portions 125, 126, respectively. In embodiments, the seal member 110 can accommodate up to ten degrees of misalignment and up to ten degrees of relative rotation about the rotational axis "RA." The intermediate portions 134, 334 can also resist pressure applied to the seal members 110, 111 when exposed to mud and other debris from the external environment.

With respect to the first seal member 110, the ring 130 is adjacent the first shoulder portion 125. The seal member 110 is arranged such that the ring 130 of the seal member 110 is in engaging contact with the first shoulder portion. The distal ring face 210 of the ring 130 is fitted on the first shoulder portion 125 with a running seal therebetween. The ring 130 is configured to inhibit the movement of contaminants from the external surface 288 of the first seal member into the mounting passage 157 of the pivot member 114 and into the maintenance free bearing 118. The ring 130 can help prevent the intermediate portion 134 from buckling when subjected to compressive loading.

The inner circumferential ring surface 218 of the ring 130 is in proximate relationship with the shaft 112 with a slip fit therebetween such that the ring 130 is pivotable about the rotational axis "RA" with respect to the shaft 112. The ring 130 slips relative to the shaft 112 when the pivot member 114 rotates about the rotational axis "RA." The ring 330 of the second seal member 111 can have a similar relationship with the second shoulder portion 126 and the shaft 112 as described above regarding the ring 130 of the first seal member 110 and the first shoulder portion 125 and the shaft 112.

INDUSTRIAL APPLICABILITY

The industrial applicability of the embodiments of a seal member described herein will be readily appreciated from the foregoing discussion. At least one embodiment of a seal member described herein can be used in a joint assembly of a machine. At least one embodiment of a joint assembly described herein can be used to pivotably mount an A-frame to a chassis of a machine.

Embodiments of a seal member according to principles of the present disclosure may find potential application in any suitable machine. Such machines may include, but are not limited to, off-highway trucks, dozers, loaders, excavators, or any other mobile or stationary machines that utilize a joint assembly or a sealing relationship as described herein.

Embodiments of a seal member according to principles of the present disclosure can be used to provide a seal for a maintenance-free bearing of a bearing joint provided to pivotably attach a pivot member, such as an A-frame, to the chassis of a machine. Typically, such a bearing is greased lubricated and requires lubrication application twice a day. A seal member according to principles of the present disclosure can be used to protect a maintenance free bearing which is not lubricated as described. A seal member according to principles of the present disclosure can provide a robust sealing solution to keep dirt and contaminants from the maintenance-free bearing over the range of intended relative motion between the pivot member and the shaft. The disclosed techniques may be applicable to provide a seal where the sealing mechanism is resistant to mud packing by the addition of a rigid ring on the seal side facing the shoulder portion projecting from the shaft.

A joint assembly constructed in accordance with principles of the present disclosure can accommodate multiple motions (such as relative movement with at least two degrees of freedom) by the pivot member while maintaining a sealing relationship that helps keep dirt and debris from the bearing. The intermediate portion of the seal member is resiliently flexible and can flex in response to the different types of relative movement made by the pivot member (e.g., rotation, misalignment, and out of plane motion such as caused by racking). The intermediate portion can help resist the fluid pressure exerted by mud packing around the joint assembly.

Figure 17:
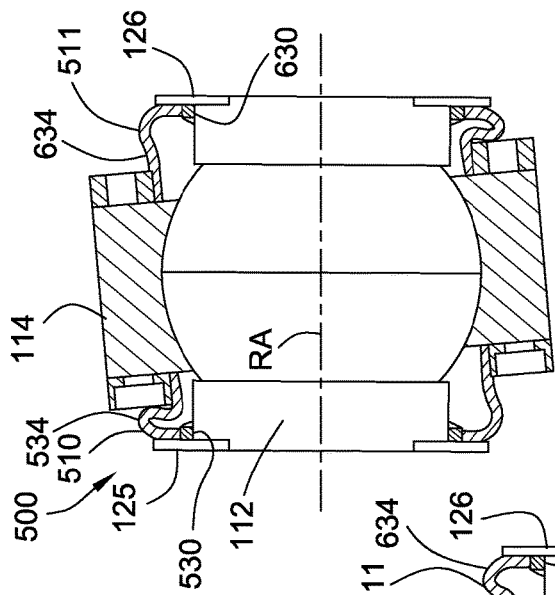
FIG. 17 is a view as in FIG. 16, but illustrating the portion of the joint assembly in a misaligned position.
Figure 16:
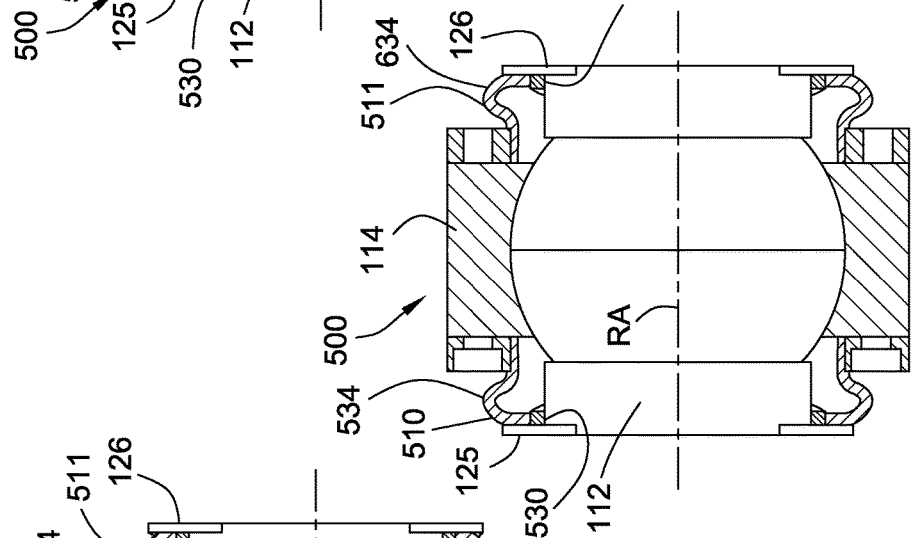
FIG. 16 is a view as in FIG. 15, but illustrating the portion of the joint assembly in an assembled position.
Figure 15:
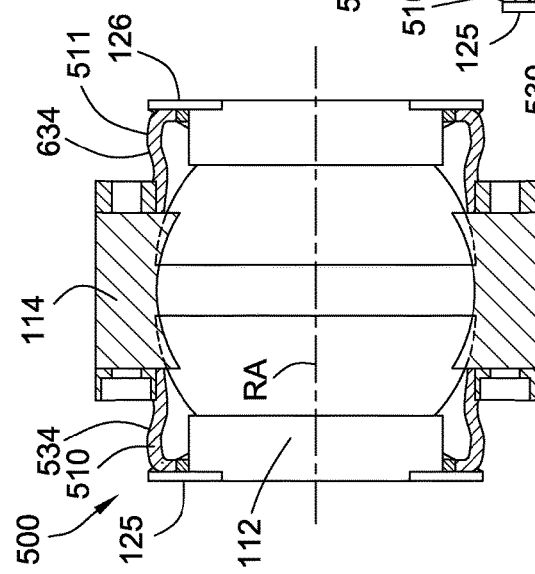
FIG. 15 is a diagrammatic, sectional view of a portion of an embodiment of a joint assembly constructed in accordance with principles of the present disclosure in a partially-assembled position.

Referring to FIGS. 15-17, computer evaluations using finite element analysis were performed to evaluate embodiments of a seal member 510, 511 constructed according to principles of the present disclosure. In FIG. 15, the seal members 510, 511 are in a partially-assembled position. The intermediate portions 534, 634 are not compressed. The intermediate portions 534, 634 have an axial length, measured along the rotational axis "RA," than the distance between the pivot member 114 and the first and second shoulder portions 125, 126, respectively, when the joint assembly 500 is in an installed position, as shown in FIG. 16. Accordingly, in FIG. 16, with the seal members 510, 511 connected to the pivot member 114 and the joint assembly 500 in an assembled condition, the intermediate portions 534, 536 act in the manner of a spring to urge the respective rings 530, 630 of the first and second seal members 510, 511 into contacting engagement with the first and second shoulder portions 125, 126 projecting radially from the shaft 112.

As shown in FIG. 17, in a misalignment condition, strain can be non-uniformly distributed along the circumference (less on the tilted side and high on the other side) of the intermediate portions 534, 634. However, contact pressure between the rings 530, 630 and the first and second shoulder portions 125, 126 can be maintained and can relatively uniformly distributed around the circumference of the rings 530, 630 in both a normal, assembled condition and the misalignment condition (see FIGS. 16 and 17).

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. It should be understood that terms such as "front," "rear," "upper," "lower," "inner," and "outer" are used only for convenient reference and should not be viewed as limiting in any way. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A seal member for a joint between a pivot member movable about a rotational axis of a shaft, the seal member comprising:
    a ring, the ring including a distal ring face, a proximal ring face, an outer circumferential ring surface, and an inner circumferential ring surface, the distal ring face and the proximal ring face both being annular and being disposed in spaced relationship to each other along a longitudinal axis, the outer circumferential ring surface extending along the longitudinal axis between the distal ring face and the proximal ring face at an outer ring perimeter thereof and circumscribing the distal ring face and the proximal ring face, the inner circumferential ring surface extending along the longitudinal axis between the distal ring face and the proximal ring face at an inner ring perimeter thereof, the inner circumferential ring surface defining a ring opening;
    a flange, the flange closer to the proximal ring face along the longitudinal axis than to the distal ring face, the flange including a pair of flange faces disposed in spaced relationship to each other along the longitudinal axis, the flange including an outer flange surface extending along the longitudinal axis between the pair of flange faces at an outer flange perimeter thereof, the flange including an inner circumferential flange surface disposed radially within the outer flange surface and extending along the longitudinal axis between the pair of flange faces at an inner flange perimeter thereof, the inner circumferential flange surface defining a flange opening; and
    an intermediate portion, the intermediate portion bonded to both the ring and the flange such that the intermediate portion is interposed between the ring and the flange, the intermediate portion being resiliently flexible, the intermediate portion having a ring end and a flange end, the ring end of the intermediate portion circumscribing, and bonded to, the outer circumferential ring surface of the ring, and the flange end of the intermediate portion bonded to the inner circumferential flange surface of the flange such that the ring is relatively movable with respect to the flange;
    wherein the intermediate portion includes an axial segment, extending along the longitudinal axis, and a radial segment, extending from the axial segment radially inwardly along a radial plane perpendicular to the longitudinal axis, the axial segment of the intermediate portion including the flange end, the flange end being annular and connected to the inner circumferential flange surface of the flange, the radial segment of the intermediate portion including the ring end and having an inner circumferential radial surface disposed radially within the axial segment of the intermediate portion, the inner circumferential radial surface of the intermediate portion circumscribing, and connected to, the outer circumferential ring surface of the ring; and
    wherein the intermediate portion includes an inner surface, the inner surface defining an intermediate passage, the inner surface including an inner taper part disposed along the axial segment at the flange end, the inner taper part being frusto-conical and converging radially inwardly in a direction from the flange to the ring, the inner surface including a convex inner part and a concave inner part, the convex inner part interposed between the concave inner part and the inner taper part, the convex inner part being annular and projecting radially inwardly, the concave inner part being annular and projecting radially outwardly relative to the convex inner part.

2. The seal member according to claim 1, wherein the outer circumferential ring surface defines an outer ring diameter, and the inner circumferential flange surface of the flange defines an inner flange diameter, the outer ring diameter of the ring being less than the inner flange diameter of the flange.

3. The seal member according to claim 1, wherein the ring is disposed in spaced relationship to the flange along the longitudinal axis such that the proximal ring face is disposed a longitudinal offset distance from the flange.

4. The seal member according to claim 1, wherein the intermediate portion includes an outer surface, the outer surface including a concave outer part and a convex outer part, the concave outer part being annular and disposed along the axial segment adjacent the flange end, the convex outer part being annular and disposed along the axial segment adjacent the radial segment such that the concave outer part is interposed between the flange end and the convex outer part along the axial segment, the convex outer part projecting radially outwardly relative to the concave outer part.

5. The seal member according to claim 4, wherein the concave outer part has a first radius of curvature, and the convex outer part has a second radius of curvature, the second radius of curvature being larger than the first radius of curvature.

6. The seal member according to claim 4, wherein the pair of flange faces comprises a proximal flange face and a distal flange face, the outer surface of the intermediate portion includes a cylindrical outer part and a flange shoulder, the cylindrical outer part disposed at the flange end and connected to the inner circumferential flange surface of the flange, the cylindrical outer part extending along the longitudinal axis between the proximal flange face and the distal flange face, the flange shoulder disposed adjacent the cylindrical outer part and projecting radially outwardly therefrom such that the flange shoulder is in engaging, radially overlapping relationship with the distal flange face.

7. The seal member according to claim 4, wherein the convex inner part is aligned with the concave outer part along the longitudinal axis, and the concave inner part is aligned with the convex outer part along the longitudinal axis.

8. The seal member according to claim 4, wherein the concave outer part has a first radius of curvature, the convex outer part has a second radius of curvature, the convex inner part has a third radius of curvature, and the concave inner part has a fourth radius of curvature, the second radius of curvature being larger than the first radius of curvature, and the fourth radius of curvature being larger than the third radius of curvature.

9. The seal member according to claim 8, wherein the second radius of curvature is larger than the third radius of curvature, the third radius of curvature is larger than the first radius of curvature, and the fourth radius of curvature is larger than the second radius of curvature.

10. The seal member according to claim 1, wherein the convex inner part has a third radius of curvature, and the concave inner part has a fourth radius of curvature, the fourth radius of curvature being larger than the third radius of curvature.

11. The seal member according to claim 1, wherein the flange defines a mounting hole extending along the longitudinal axis between the pair of flange faces.

12. The seal member according to claim 11, wherein the pair of flange faces comprises a proximal flange face and a distal flange face, and the mounting hole comprises a mounting hole passage and a counterbore, the counterbore being radially larger than the mounting hole passage, the counterbore disposed adjacent the distal flange face.

13. The seal member according to claim 1, wherein the ring and the flange are both more rigid than the intermediate portion.

14. The seal member according to claim 13, wherein the ring is made from nylon, the flange is made from metal, and the intermediate portion is made from rubber.

15. A joint assembly for a machine, the joint assembly comprising:
  a shaft defining a rotational axis and including a shoulder portion projecting radially therefrom;
  a pivot member, the pivot member mounted with respect to the shaft such that the pivot member is pivotable about the rotational axis with respect to the shaft; and
  a seal member, the seal member mounted to the pivot member and pivotable about the rotational axis with respect to the shaft, the seal member including:
    a ring, the ring including a distal ring face, a proximal ring face, an inner circumferential ring surface, and an outer circumferential ring surface, the distal ring face and the proximal ring face both being annular and being disposed in spaced relationship to each other along the rotational axis, the inner circumferential ring surface and the outer circumferential ring surface extending along the rotational axis between the distal ring face and the proximal ring face at an inner ring perimeter and an outer ring perimeter thereof, respectively, the inner circumferential ring surface defining a ring opening, the shaft extending through the ring opening, the distal ring face in contacting relationship with the shoulder portion of the shaft,
    a flange, the flange being mounted to the pivot member, the flange including a pair of flange faces disposed in spaced relationship to each other along the rotational axis, the flange including an inner circumferential flange surface extending along the rotational axis between the pair of flange faces at an inner flange perimeter thereof, the inner circumferential flange surface defining a flange opening, the shaft extending through the flange opening, and
    an intermediate portion, the intermediate portion bonded to both the ring and the flange such that the intermediate portion is interposed between the ring and the flange along the rotational axis, the intermediate portion being resiliently flexible, the intermediate portion having a ring end and a flange end, the ring end of the intermediate portion circumscribing, and bonded to, the outer circumferential ring surface of the ring, and the flange end of the intermediate portion bonded to the inner circumferential flange surface of the flange such that the ring is relatively movable with respect to the flange, the intermediate portion defining an intermediate passage, the shaft extending through the intermediate passage,
    wherein the intermediate portion includes an axial segment, extending along the longitudinal axis, and a radial segment, extending from the axial segment radially inwardly along a radial plane perpendicular to the longitudinal axis, the axial segment of the intermediate portion including the flange end the flange end being annular and connected to the inner circumferential flange surface of the flange, the radial segment of the intermediate portion including the ring end and having an inner circumferential radial surface disposed radially within the axial segment of the intermediate portion, the inner circumferential radial surface of the intermediate portion circumscribing, and connected to, the outer circumferential ring surface of the ring, and
    wherein the intermediate portion include an inner surface, the inner surface defining an intermediate passage, the inner surface including an inner taper part disposed along the axial segment at the flange end, the inner taper part being frusto-conical and converging radially inwardly in a direction from the flange to the ring, the inner surface including a convex inner part and a concave inner part, the convex inner part interposed between the concave inner art and the inner taper part, the convex inner part being annular and projecting radially inwardly, the concave inner part being annular and projecting radially outwardly relative to the convex inner part.

16. The joint assembly according to claim 15, wherein the pivot member has a first pivot member side, a second pivot member side, and a mounting nose, the mounting nose defining a mounting passage, the shaft disposed within the mounting passage, and the seal member comprises a first seal member, the flange of the first seal member mounted to the first pivot member side of the pivot member, the first seal member at least partially occluding the mounting passage from the first pivot member side, and the joint assembly further comprising:
  a bearing, the bearing interposed between the shaft and the pivot member and disposed within the mounting passage, the bearing defining a bearing interface about which the pivot member is pivotable with respect to the shaft;
  a second seal member, the second seal member mounted to the second pivot member side of the pivot member, the second seal member at least partially occluding the mounting passage from the second pivot member side.

17. The joint assembly according to claim 15, wherein the outer circumferential ring surface of the ring of the seal member defines an outer ring diameter, and the inner circumferential flange surface of the flange of the seal member defines an inner flange diameter, the outer ring diameter of the ring being less than the inner flange diameter of the flange.

18. The joint assembly according to claim 15, wherein the intermediate portion of the seal member includes an outer surface, the outer surface including a concave outer part and a convex outer part, the concave outer part being annular and disposed along the axial segment adjacent the flange end, the convex outer part being annular and disposed along the axial segment adjacent the radial segment such that the concave outer part is interposed between the flange end and the convex outer part along the axial segment, the convex outer part projecting radially outwardly relative to the concave outer part.

19. The joint assembly according to claim 18, wherein the pair of flange faces of the seal member comprises a proximal flange face and a distal flange face, the outer surface of the intermediate portion of the seal member includes a cylindrical outer part and a flange shoulder, the cylindrical outer part disposed at the flange end and connected to the inner circumferential flange surface of the flange, the cylindrical outer part extending along the longitudinal axis between the proximal flange face and the distal flange face, the flange shoulder disposed adjacent the cylindrical outer part and projecting radially outwardly therefrom such that the flange shoulder is in engaging, radially overlapping relationship with the distal flange face.

20. The seal joint assembly according to claim 15, wherein the ring of the seal member and the flange of the seal member are both more rigid than the intermediate portion of the seal member.

\* \* \* \* \*